United States Patent Office 3,470,985
Patented Oct. 7, 1969

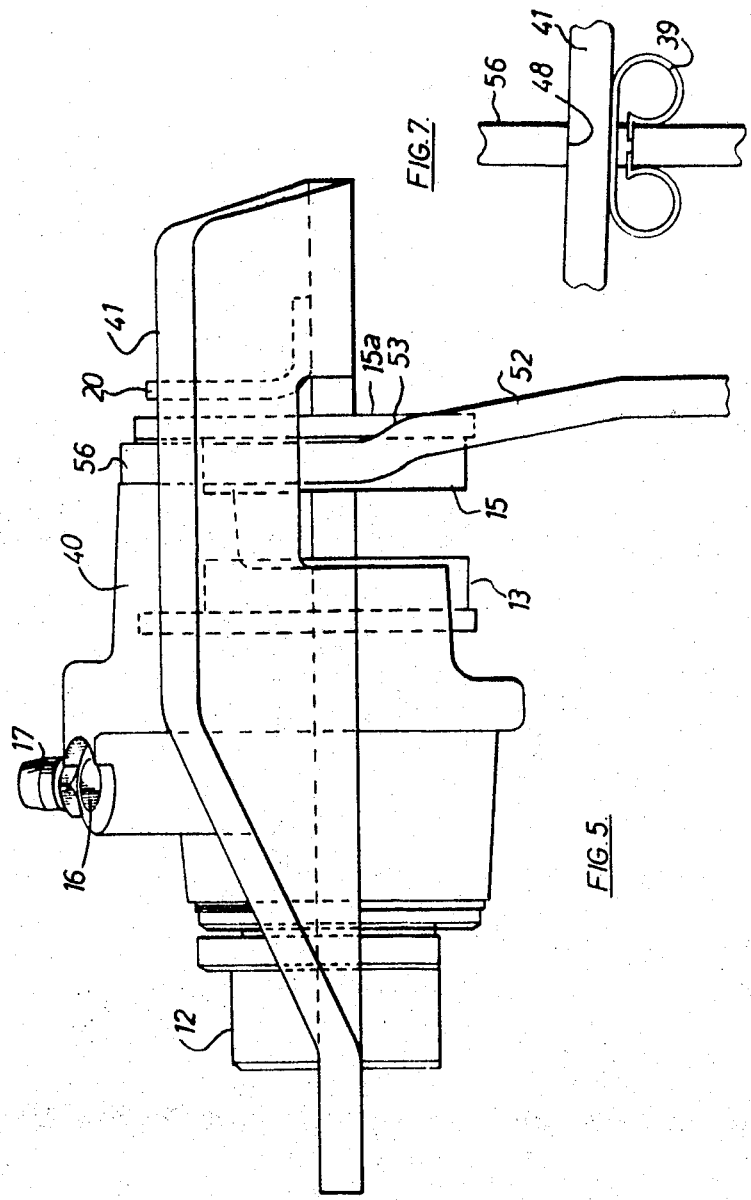

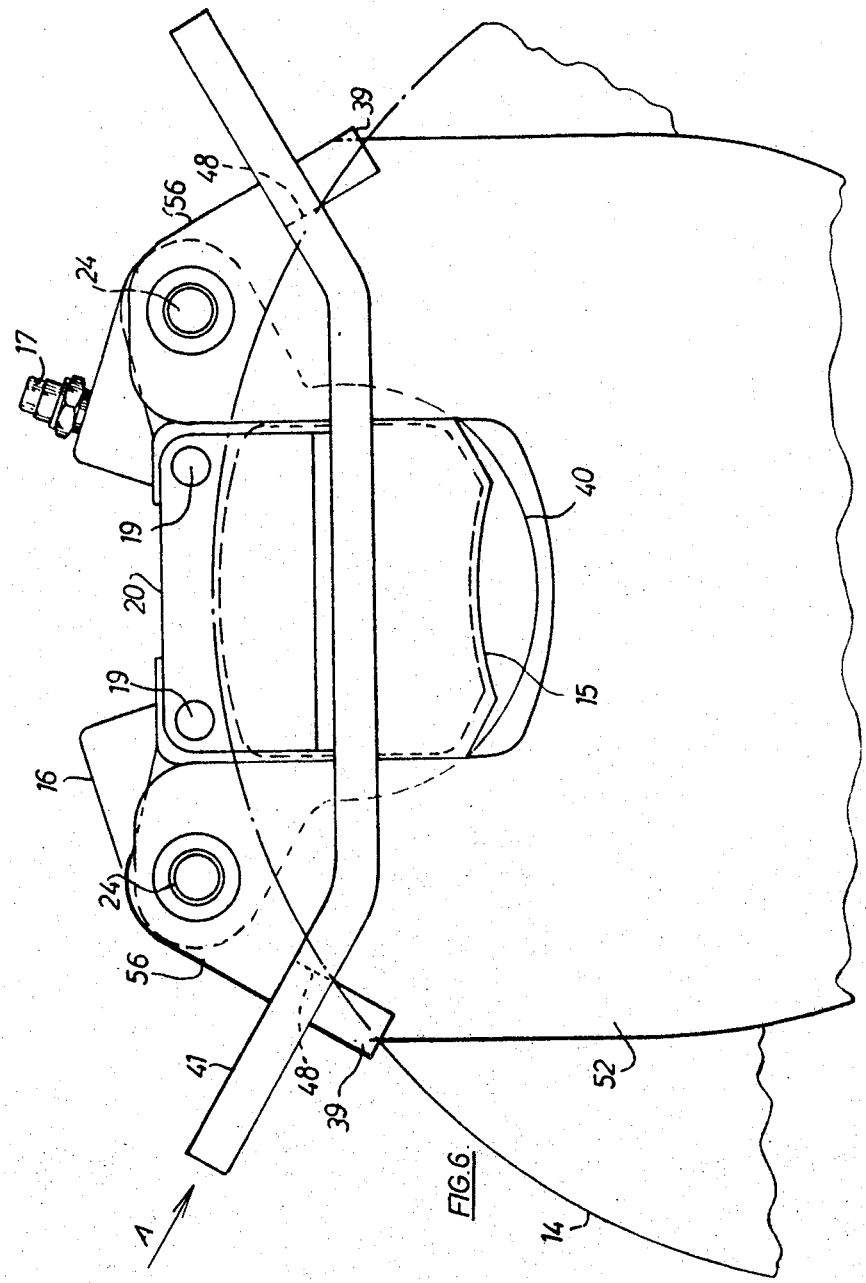

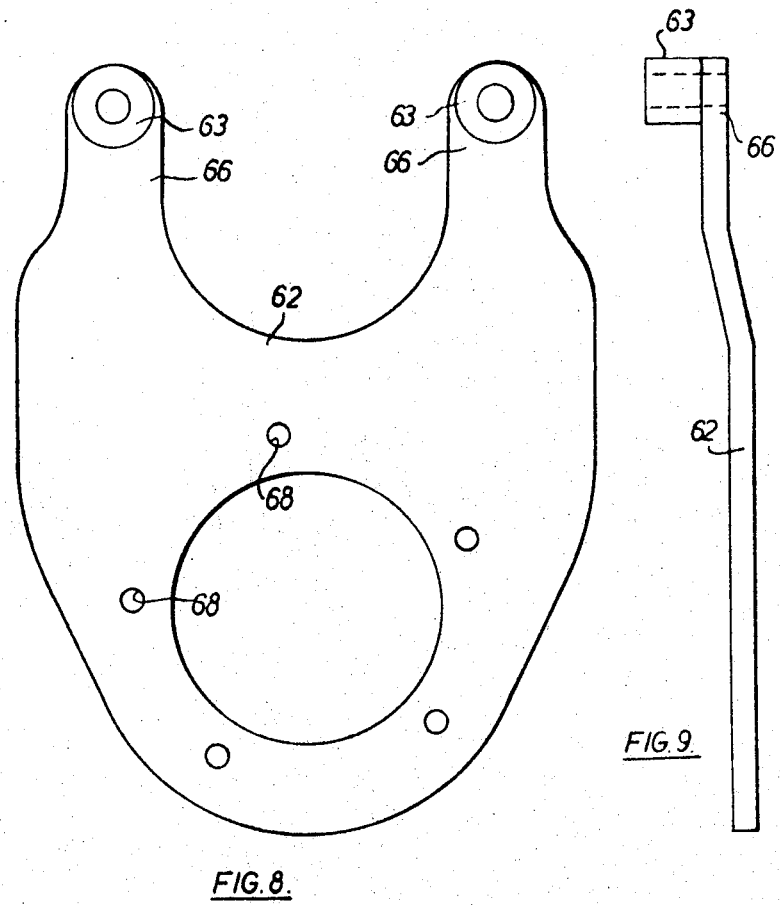

3,470,985
DISC BRAKES
Leonard Redmayne, Solihull, and Maurice A. Wade, Sutton Coldfield, England, assignors to Girling Limited, Tyseley, Birmingham, England
Filed Apr. 8, 1968, Ser. No. 719,448
Claims priority, application Great Britain, Apr. 13, 1967, 16,934/67
Int. Cl. F16d 65/18
U.S. Cl. 188—73          6 Claims

ABSTRACT OF THE DISCLOSURE

The invention relates to a reaction type disc brake in which a yoke straddles a fixed body member containing an actuator operative between a directly operated pad and the yoke which acts on an indirectly operated pad. The body member is preferably bolted to a mounting bracket which is disposed at the side of the disc remote from the directly operated pad and which is also straddled by the yoke.

---

The invention relates to a reaction type disc brake, i.e. a disc brake having an actuator operative between a directly operated pad and a caliper supporting an indirectly operated pad. The invention relates more particularly to a reaction type disc brake in which the caliper comprises an axially slidable yoke straddling a fixed body member containing the actuator.

According to the present invention the fixed body member is attached to a mounting bracket disposed at the side of the disc remote from the directly operated pad.

Preferably the yoke also straddles the mounting bracket and the body member is attached to the bracket beyond the periphery of the disc.

The invention is further described, by way of example, with reference to the accompanying drawings, in which:

FIG. 7 is a detail view in the direction of the arrow A of FIG. 6.

FIG. 8 is an elevation of a modified mounting bracket for the disc brake, and

FIG. 9 is an edge view of the mounting bracket of FIG. 8.

Figure 1:
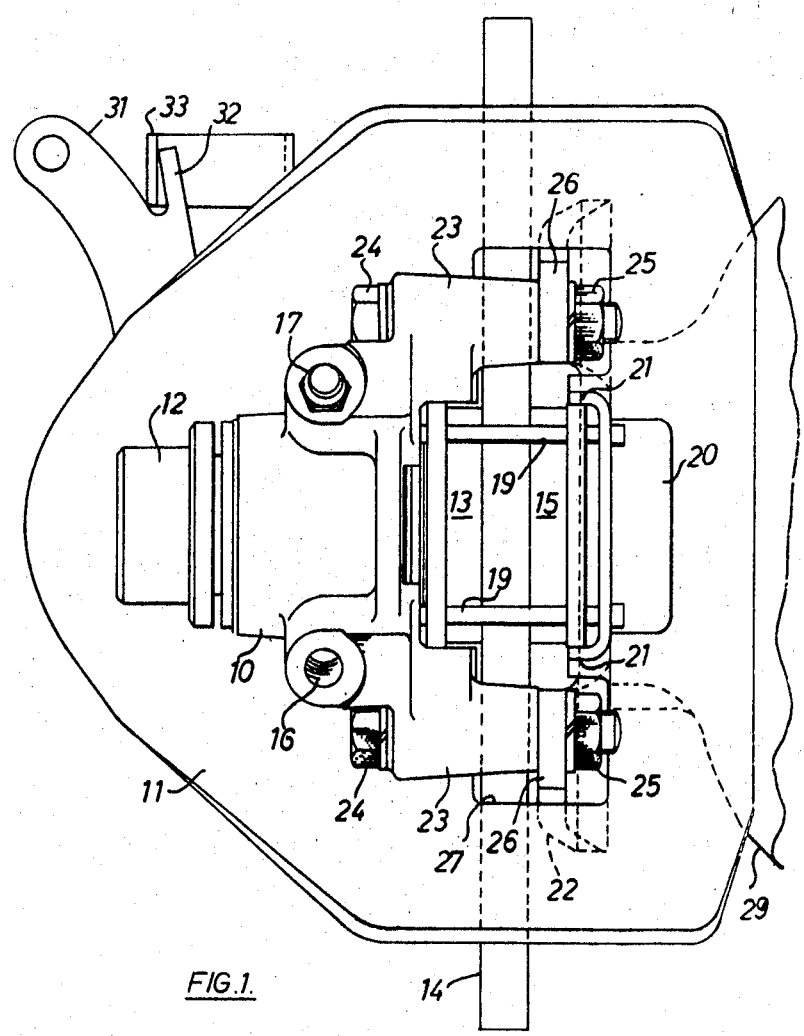
FIG. 1 is a plan view of a disc brake constructed in accordance with one embodiment of the invention.
Figure 2:
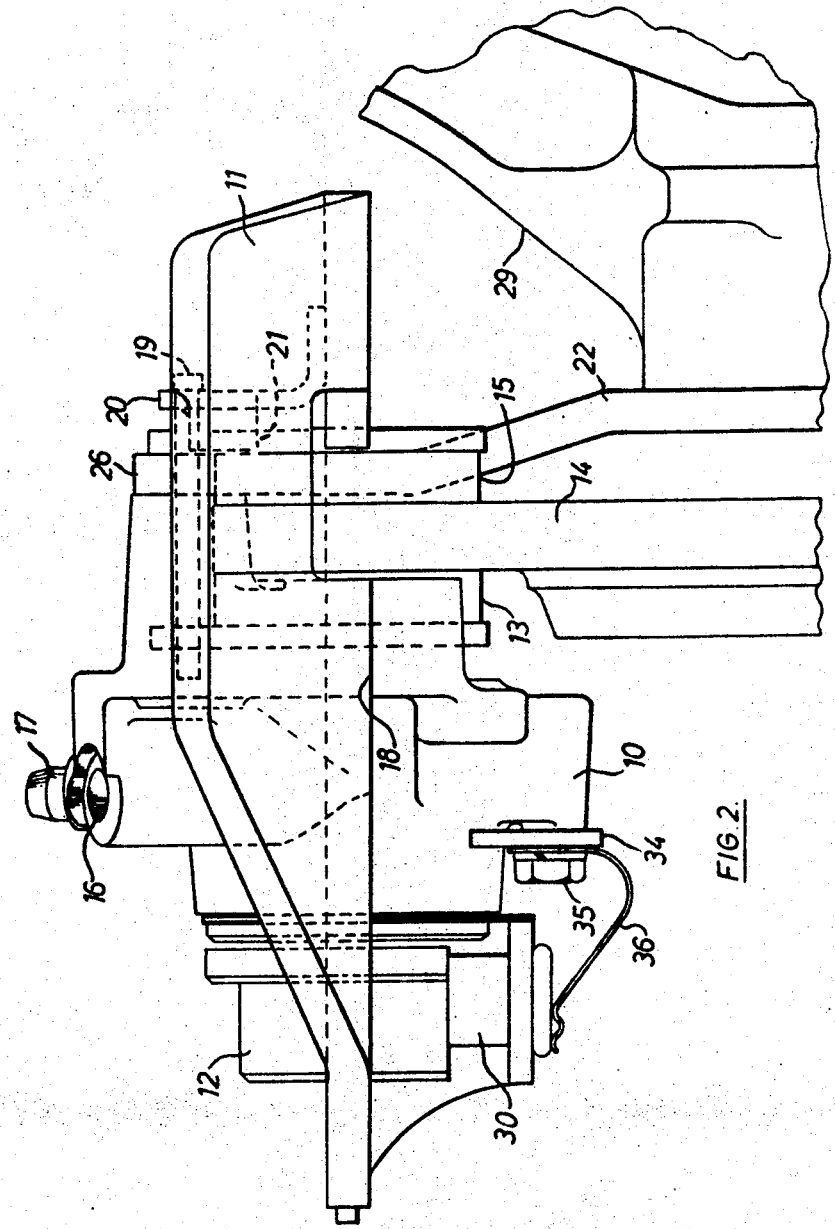
FIGS. 2 and 3 are side and end elevations respectively of the brake of FIG. 1, FIGS. 4, 5 and 6 are views corresponding to FIGS. 1 to 3 of a second embodiment of the disc brake.
Figure 3:
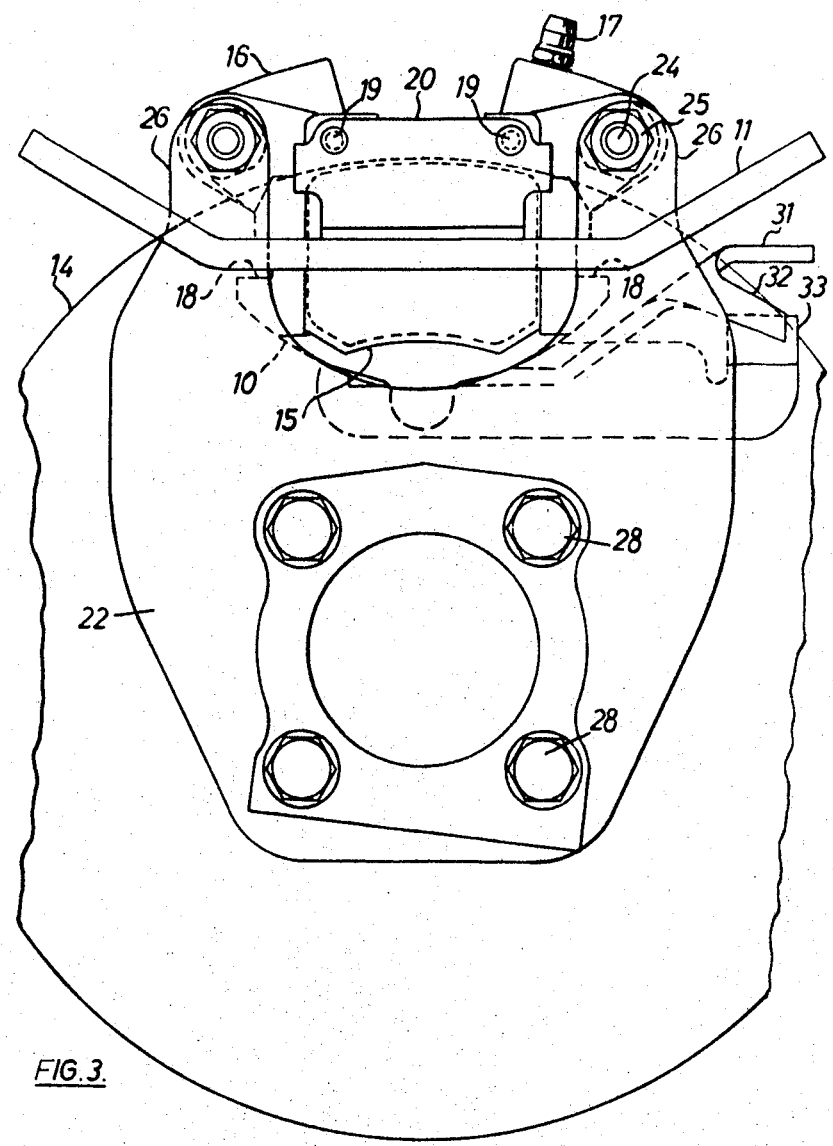

Referring now to FIGS. 1, 2 and 3 of the drawings, a spot type disc brake comprises a body member 10, containing a hydraulic actuator, and a yoke 11 slidably received in longitudinal grooves 18 along opposite sides of the body member 10. The hydraulic actuator comprises a pair of opposed pistons slidable in an axial through bore within the body member. One piston, the reaction piston, has an extension 12 which acts upon the yoke 11 and the other piston acts upon a directly operated pad 13 which engages one face of a disc 14. The other face of the disc 14 is engaged by an indirectly operated pad 15 which is acted upon by the yoke 11. A brake fluid inlet 16 in the body member 10 communicates with the space between the opposed pistons as does a bleeder orifice 17. Two long pins 19 pass through a bracket 20 welded to the yoke 11 adjacent the indirectly operated pad 15 and are retained on the body member 10 by spring clips (not shown) located on the pins between the bracket 20 and the pad 15. Side lugs 21 on the bracket 20 help to locate the pad 15. These pins pass through the backplates of the pads 13 and 15 and locate these pads radially. The drag from the directly operated pad 13 is transferred directly through its backplate to the body member 10 whilst the drag from the indirectly operated pad 15 is transferred to the yoke 11 and from the yoke 11 to the body member 10. The yoke 11 is bent upwardly at its sides to reduce the length of the opening 27 and so increase the strength of the yoke.

The body member 10 is fixed in position adjacent the disc 14 by a mounting bracket plate 22 arranged on the same side of the disc 14 as the indirectly operated pad 15. For this purpose the body member 10 is formed with a pair of lugs 23 radially beyond the periphery of the disc and axially projecting to the side of the disc 14 adjacent the indirectly operated pad 15. Bolts 24 and nuts 25 secure the lugs 23 to ears 26 on the bracket plate 22. The ears 26 pass through the aperture 27 formed in the yoke 11 to receive the periphery of the disc 14. The bracket plate 22 is attached by bolts 28 to the rear axle differential casing 29 of the vehicle to which the brake is fitted.

The brake is applied by the application of brake fluid pressure through the inlet 16, such pressure acting on one piston to apply the pad 13 directly whilst the reaction caused by the fluid pressure acting on the other piston is transferred by the yoke 11 to the indirectly operated pad 15.

The hydraulic actuator may incorporate between its pistons an automatic adjuster of the kind described in U.S.A. patent applications Nos. 618,914 (Farr) and 650,-143 (Hoenick et al.) and U.S.A. Patent No. 3,402,791 (Hoenick), such applications also describing the construction of the actuator itself in more detail.

An auxiliary mechanical actuator (hand brake) is also provided and comprises a cam journalled by a spindle 30 in the extension 12 of the reaction piston and acting upon the reaction piston itself and thereby through the automatic adjuster upon the other piston which engages the pad 13. An actuating lever 31 is attached to the spindle 30 and also has a finger 32 normally in engagement with a stop 33 on a bracket 34. A screw 35 secures the bracket 34 to the body member 10 and also secures a spring 36 which holds the cam spindle 30 in place.

The disc brake shown in FIGS. 4 to 7 is in many respects similar to that shown in FIGS. 1, 2 and 3 and like parts are denoted by like reference numerals and will not be described again. The principal difference between the two embodiments is that the yoke 41, unlike the yoke 11, is not slidably supported in grooves in the body member 40 but is instead slidably supported in notches 48 formed in the ears 56 on the bracket plate 52. A spring 39 acts between the lower wall of each notch 48 and the yoke 11 to bias the yoke against the upper walls of the notches 48 to prevent spragging. This is most clearly shown in FIG. 7.

Another difference between the two embodiments is that the indirectly operated pad 15 is circumferentially located by its backplate 15a between the ears 56 on the bracket plate 52.

The drag from the pad 15 is thereby transferred directly to the bracket plate and not to the yoke 11 or the body member 40. The bracket plate 52 has a cranked portion 53 which ensures that pad 15 is properly located both before and after pad wear has taken place. If a proportion of the drag from the pad 15 is transferred to the yoke 41 by engagement of the backplate 15a with the yoke, such drag is then transferred from the yoke 41 to the ears 56 on the bracket plate 52 in virtually the same plane so that substantially no couple is applied to the yoke 41.

Figure 4:
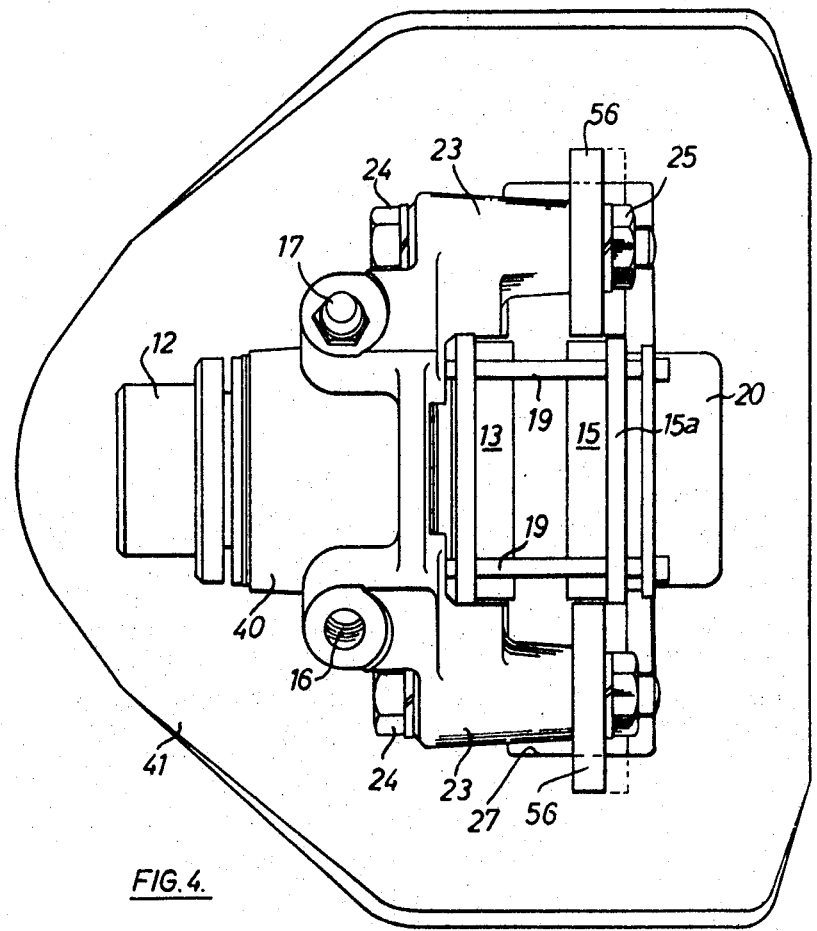

Although FIGS. 4 to 6 do not show a mechanical actuator, an actuator similar to that of FIGS. 1 to 3 may be provided.

In the embodiments of FIGS. 1 to 7 the body member 10, 40 has lugs which extend axially over the periphery of the disc 14 and by which the body member is bolted to the bracket plate 22, 52. FIGS. 8 and 9 show another embodiment of bracket plate 62 whose ears 66 extending radially beyond the periphery of the disc are provided with bushes 63 which extend axially over the periphery of the disc and act as spacers. This enables the size of the lugs on the body member to be correspondingly reduced.

The embodiments of disc brake illustrated in the drawings are useful in the case wherein the brake is to be mounted inboard of the rear wheels of a rear wheel drive vehicle. In this case there is likely to be a shortage of space between the disc and the differential casing making it necessary to position the body member 10 or 40 on the opposite side of the disc to the differential casing. The differential casing is the only convenient unsprung part of the vehicle to which the brake can be mounted inboard of the rear wheels.

We claim:
1. A reaction type disc brake comprising a body member, a yoke having an aperture therein, a brake disc having a periphery protruding through said yoke aperture, said yoke being slidably supported on said body member with said body member located in said aperture and at one side of said disc, a mounting bracket disposed at the side of said disc remote from said body member and having portions projecting through said yoke aperture, means fixing said body member to said projecting portions of said bracket, said fixing means being disposed radially outwardly of the periphery of said disc, opposed directly and indirectly operated pads disposed at opposite sides of said disc for cooperation therewith, and an actuator in said body member, said actuator being operative between said directly operated pad and said yoke and said yoke being operative upon said indirectly operated pad.

2. A disc brake according to claim 1 in which said body member has longitudinal grooves along opposite sides thereof, said yoke being slidably mounted in said longitudinal grooves.

3. A disc brake according to claim 1 including means locating the directly operated pad on the body member whereby the drag from the directly operated pad is transferred directly to the body member and means locating the indirectly operated pad on the yoke whereby the drag from the indirectly operated pad is transferred to the yoke and from the yoke to the body member.

4. A disc brake according to claim 1 in which said body member has lugs and said projecting portions on said mounting bracket comprise ears extending radially beyond the periphery of said disc, and in which said fixing means comprise bolt means passing axially through said lugs and said ears.

5. A disc brake according to claim 4 in which said lugs extend axially over the periphery of the disc.

6. A disc brake according to claim 4 in which the ears of the mounting bracket have spacing bushes thereon extending axially over the periphery of the disc.

References Cited

UNITED STATES PATENTS

| | | | |
|---|---|---|---|
| 2,784,811 | 3/1957 | Butler | 188—73 |
| 2,820,530 | 1/1958 | Chouings et al. | 188—73 |
| 3,165,173 | 1/1965 | Thirion | 188—73 |
| 3,166,158 | 1/1965 | Burnett et al. | |
| 3,245,500 | 4/1966 | Hambling et al. | |

GEORGE E. A. HALVOSA, Primary Examiner

U.S. Cl. X.R.

188—205